(12) United States Patent
Renault et al.

(10) Patent No.: US 12,012,197 B2
(45) Date of Patent: Jun. 18, 2024

(54) STRATEGY FOR SAFEGUARDING AN AIRSHIP IN THE EVENT OF HEATING OF ITS SOLAR GENERATOR

(71) Applicant: THALES, Courbevoie (FR)

(72) Inventors: Hervé Renault, Cannes la Bocca (FR); Jean-Pierre Prost, Cannes la Bocca (FR); Magali Mesrine, Cannes la Bocca (FR)

(73) Assignee: THALES, Courbevoie (FR)

( * ) Notice: Subject to any disclaimer, the term of this patent is extended or adjusted under 35 U.S.C. 154(b) by 443 days.

(21) Appl. No.: 17/107,796

(22) Filed: Nov. 30, 2020

(65) Prior Publication Data

US 2021/0171179 A1 Jun. 10, 2021

(30) Foreign Application Priority Data

Dec. 5, 2019 (FR) ...................................... 1913802

(51) Int. Cl.
*B64B 1/42* (2006.01)
*B64B 1/02* (2006.01)
*B64B 1/40* (2006.01)
*B64D 27/24* (2006.01)
*B64D 27/353* (2024.01)

(52) U.S. Cl.
CPC ................. *B64B 1/42* (2013.01); *B64B 1/02* (2013.01); *B64B 1/40* (2013.01); *B64D 27/24* (2013.01); *B64D 27/353* (2024.01)

(58) Field of Classification Search
CPC .... B64B 1/42; B64B 1/02; B64B 1/40; B64B 1/36; B64D 2211/00
See application file for complete search history.

(56) References Cited

U.S. PATENT DOCUMENTS 6,540,178 B1 4/2003 Hillsdon
6,609,680 B2 8/2003 Perry et al.
(Continued)

FOREIGN PATENT DOCUMENTS

CN 107 979 157 A 5/2018

OTHER PUBLICATIONS

Alfred State College, Photovoltaic Efficiency and The Temperature Effect, Feb. 25, 2016, [youtube.com/watch?v=SVyWz4Zr03s] (Year: 2016).*

(Continued)

*Primary Examiner* — Timothy D Collins
*Assistant Examiner* — Justin Michael Heston
(74) *Attorney, Agent, or Firm* — BakerHostetler

(57) ABSTRACT

A stratospheric airship includes a nonrigid balloon equipped with a solar generator arranged on the upper part of the nonrigid balloon intended to be illuminated in flight by the sun, the airship comprising: at least one device for managing the position of the centre of gravity of the airship; at least one device for stabilizing the attitude of the airship; and a module for the coupled control of the devices, configured to control the airship, when the speed of travel of the airship with respect to the surrounding air is below a first threshold (S1) and/or the temperature of the solar generator is above a second threshold (S2), in such a way that it rotates by substantially half a turn about its longitudinal axis (AL), so as to protect the solar generator from illumination by the sun.

14 Claims, 3 Drawing Sheets

(56) References Cited

U.S. PATENT DOCUMENTS

| | | | |
|---|---|---|---|
| 2002/0096599 A1* | 7/2002 | McDermott | H01L 31/042 244/25 |
| 2006/0261213 A1* | 11/2006 | Lavan | B64C 3/30 244/30 |
| 2007/0095975 A1* | 5/2007 | Walden | B64B 1/70 244/30 |
| 2014/0014769 A1 | 1/2014 | Devaul et al. | |
| 2014/0263827 A1* | 9/2014 | Smith | G05D 1/0808 244/96 |
| 2015/0076279 A1* | 3/2015 | Nelson | B64B 1/12 244/30 |
| 2015/0076281 A1 | 3/2015 | Laskaris | |
| 2017/0019055 A1 | 1/2017 | Boulanger et al. | |

OTHER PUBLICATIONS

Indian Institute of Science—Design of Photovoltaic Systems, Effect of Temperature, Jan. 18, 2017, [youtube.com/watch?v=zQbPzKU4gW8] (Year: 2017).*

Meng, et al., "Thermal protection method of the solar array for stratospheric airships", Applied Thermal Engineering 111, pp. 802-810, 2017.

* cited by examiner

STRATEGY FOR SAFEGUARDING AN AIRSHIP IN THE EVENT OF HEATING OF ITS SOLAR GENERATOR

CROSS-REFERENCE TO RELATED APPLICATIONS

This application claims priority to foreign French patent application No. FR 1913802, filed on Dec. 5, 2019, the disclosure of which is incorporated by reference in its entirety.

FIELD OF THE INVENTION

The invention relates to nonrigid airship platforms, commonly referred to by their English name of "blimp", equipped with a solar generator.

BACKGROUND

The vast majority of tropospheric airships employ not solar generators but a source of nonrenewable energy such as kerosene. The troposphere is situated between the surface of the globe and the stratosphere, and the stratosphere is the second layer of the Earth's atmosphere, comprised between the troposphere (below) and the mesosphere (above). The upper limit of the troposphere, the tropopause, is situated at an altitude of approximately 8 to 15 kilometres depending on the latitude and the season.

Solar generators on the other hand are commonplace on stratospheric airships. It is known practice to employ a thermal control of the solar generator based on the installation of exchangers and thermal protections built into the solar generator, as described for example in "Thermal protection method of the solar array for stratospheric airships" by Junhui Meng, Zhongbing Yao, Huafei Du, Mingyun Lv in Applied Thermal Engineering 111 (2017) 802-810. The impact of such a solution in terms of mass is then great if not to say prohibitive for obtaining the desired performance of such airships, in terms of altitude, speed and availability, thus jeopardizing their feasibility.

Furthermore, excessive heating of the solar generator may be the result of the airship travelling too slowly with respect to the surrounding air, and thus experiencing insufficient forced convection.

SUMMARY OF THE INVENTION

It is an object of the invention to alleviate the above-mentioned problems, and notably to avoid excessive heating of the solar generator in the event of excessively low forced convection.

One aspect of the invention proposes a stratospheric airship comprising a nonrigid balloon equipped with a solar generator arranged on the upper part of the nonrigid balloon intended to be illuminated in flight by the sun, the airship comprising: at least one device for managing the position of the centre of gravity of the airship; at least one device for stabilizing the attitude of the airship; and a module for the coupled control of said devices, configured to control the airship, when the speed of travel of the airship with respect to the surrounding air is below a first threshold and/or the temperature of the solar generator is above a second threshold, in such a way that it rotates by substantially half a turn about its longitudinal axis, so as to protect the solar generator from illumination by the sun.

Thus, when the speed of the airship with respect to the surrounding air is below a first threshold above which thermal regulation by convection with the surrounding air prevents the solar generator, and therefore the balloon and its gas, from overheating, the invention makes it possible to avoid damage to the stratospheric airship in that case, in which the temperature of the solar generator increases very quickly if ever the sun illuminates it. Likewise, when the temperature of the solar generator exceeds a second threshold, or when both conditions are met, the invention makes it possible to avoid damage to the stratospheric airship. The invention thus makes it possible, in this type of situation, to avoid rupture of the solar generator, and damage to the balloon supporting it by preventing it from experiencing damage through increase in the temperature of the balloon material under the solar generator, or through heating of the lift-generating gas and increase in the internal pressure and therefore tensions in the balloon material.

Such a stratospheric airship therefore has the ability to hide the solar generator from the sun, and thus prevent the solar generator from increasing in temperature under the effect of the solar flux, thereby relaxing the associated thermal and mechanical stresses. It also makes it possible to avoid an increase in the thermal fluxes generated towards the nonrigid balloon and liable to cause damage or even rupture thereof, and to limit the induced heating of the lift-generating gas inside the nonrigid balloon by conduction through the balloon, thus limiting the increase in the internal pressure which is something which may likewise cause the balloon to rupture.

What is meant by coupled control is the coordinated management of the device for stabilizing the attitude of the airship and of the device for managing the position of the centre of gravity of the airship. This coupling also includes detecting that the airspeed has dropped below a first predefined threshold and/or that the temperature of the solar generator has risen above a second predefined threshold.

In one embodiment, the first threshold is below 10 ms$^{-1}$.

Specifically, a sufficiently high speed makes it possible to maximize the forced convection and therefore to reduce the thermal impact that the solar flux has on the solar generator and on the balloon. The consequence is therefore a relaxation or an easing-off of the engineering specifications for these elements.

According to one embodiment, the first threshold is equal to 5 ms$^{-1}$.

Such a threshold entails raising the specification regarding the ability of the solar generator and of the balloon to withstand temperature, but offers more of a margin with respect to the maximum airspeed that the airship can achieve, and this eases off the constraints imposed on the manoeuvres that can be performed in flight.

In one embodiment, the second threshold is below 120° C., and for example is equal to 100° C.

In one embodiment, the device for managing the position of the centre of gravity of the airship is an active device.

Using an active device for managing the position of the centre of gravity makes it possible to optimize the configuration of the airship to suit the requirements, to facilitate the manoeuvres required during the various phases of flight and to render it more robust against variations in the surroundings.

According to one embodiment, the active device for managing the position of the centre of gravity of the airship comprises controlled elements configured to shift weights.

For example, the controlled elements may comprise actuators and return devices.

The weights may be elements carried on board the airship specifically for performing this function, or may be elements used by the airship in flight for other functions and rendered mobile in order to add this active management feature.

The active device for managing the position of the centre of gravity of the airship may comprise at least one element able to move around the balloon.

In one embodiment, the device for managing the position of the centre of gravity of the airship is a passive device.

For example, the passive device for managing the position of the centre of gravity of the airship may comprise a predetermined positioning of elements carried on board the airship, so that the centre of gravity of the airship is situated between its longitudinal axis and the solar generator.

This passive management of the position of the centre of gravity has the chief advantage of being operationally simpler than the active system, involving no mechanism.

The on-board elements may comprise at least one electric battery, and/or at least one fuel cell and/or at least one fuel tank.

According to one embodiment, the device for stabilizing the attitude of the airship is an active device.

For example, the active device for stabilizing the attitude of the airship may comprise aerodynamic control surfaces and/or gimbal-mounted thrusters and/or side thrusters and/or flywheels.

In one embodiment, the device for stabilizing the attitude of the airship is a passive device.

For example, the passive device for stabilizing the attitude of the airship may be a pendulum return induced by a predetermined siting of the centre of gravity of the airship, away from the longitudinal axis.

The objective is for the centre of gravity of the airship to be sited in such a way that it is situated on the correct side of the longitudinal axis according to the needs, i.e. between its longitudinal axis and the solar generator situated above, facing into the sun in the case of airspeed below the first threshold, and/or in the case of a solar generator temperature above the second threshold, and between its longitudinal axis and the payload gondola in the nominal case.

Another aspect of the invention also proposes a method for controlling a stratospheric airship comprising a nonrigid balloon equipped with a solar generator arranged on the upper part of the nonrigid balloon intended to be illuminated in flight by the sun, wherein the position of the centre of gravity of the airship and the stabilization of the attitude of the airship are controlled in a coupled manner so that, when the speed of travel of the airship with respect to the surrounding air is below a first threshold and/or when the temperature of the solar generator is above the second threshold, the airship rotates by substantially half a turn about its longitudinal axis so as to protect the solar generator from illumination by the sun.

BRIEF DESCRIPTION OF THE DRAWINGS

The invention will be better understood from studying a number of embodiments described by way of entirely non-limiting examples illustrated by the attached drawings, in which the figures:

and FIG. 2b schematically illustrates a stratospheric airship, according to the aspect of the invention of FIG. 2a;

FIG. 3b schematically illustrates a stratospheric airship, according to the aspect of the invention of FIG. 3a.

DETAILED DESCRIPTION

In all of the figures, the elements that have identical references are similar.

Figure 1:
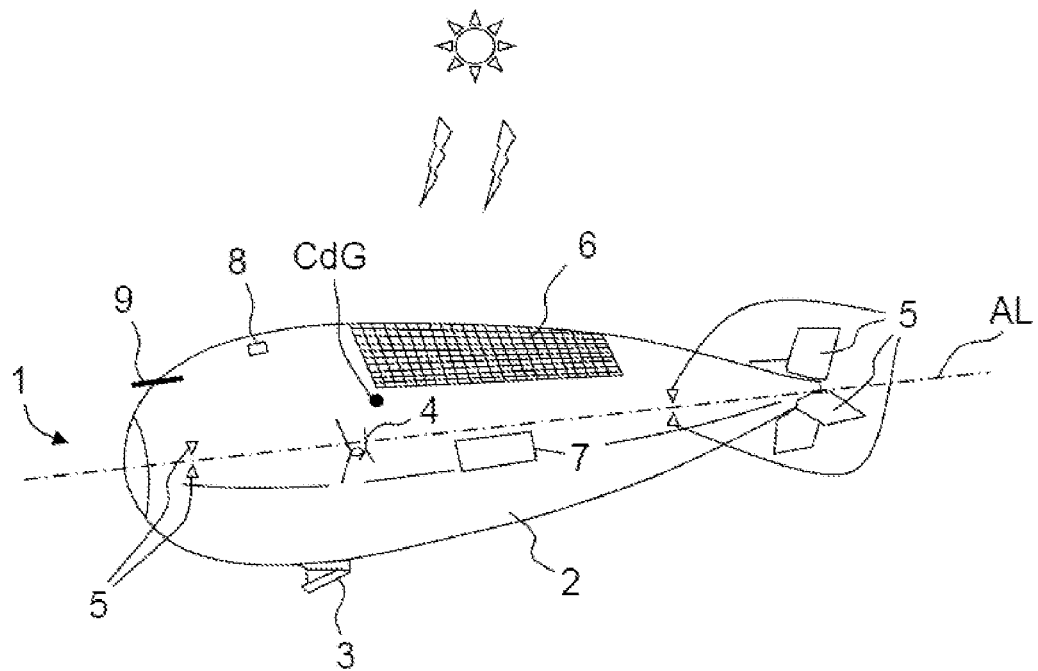
FIG. 1 schematically illustrates a stratospheric airship, according to one aspect of the invention.

FIG. 1 depicts a stratospheric airship 1 comprising a nonrigid balloon 2, a gondola 3, thrusters 4 and a device 5 for stabilizing the attitude of the airship.

The nonrigid balloon 2 comprises a solar generator 6 arranged on the upper part of the nonrigid balloon 2 intended to be illuminated in flight by the sun. The solar generator 6 may be internal or external to the balloon 2.

The gondola 3 carries the power supply and control systems as well as the technical equipment needed for the various missions of the airship, which may involve observation, surveillance or telecommunications.

The solar generator 6 makes it possible by day to power the on-board equipment, and to recharge the electrical energy storage system which then takes over at night.

The airship 1 comprises at least one device 7 for managing the position of the centre of gravity of the airship, at least one device 5 for stabilizing the attitude of the airship, and a module 8 for the coupled control of said devices, so that the airship 1, when the speed of travel of the airship with respect to the surrounding air is below a first threshold S1 and/or the temperature of the solar generator is above a second threshold S2, rotates by substantially half a turn about its longitudinal axis AL so as to protect the solar generator 6 from illumination by the sun.

Each of the devices (7, 5) for managing the position of the centre of gravity of the airship and for stabilizing the attitude of the airship may be active or passive, even though not all of the cases have been illustrated in detail in the following portion of the description.

The airship 1 comprises a sensor 9 for measuring the speed of travel of the airship 1 with respect to the surrounding air.

The first threshold S1 is below 10 ms$^{-1}$, and advantageously is equal to 5 ms$^{-1}$.

The second threshold S2 is below 120° C., and advantageously is equal to 100° C.

When the device 7 for managing the position of the centre of gravity of the airship 1 is an active device, it may comprise controlled elements configured to shift weights 7a. The controlled elements may comprise actuators 7b and return devices 7c, and the weights (7a) may comprise elements carried on board the airship 1 specifically designed to perform this function (such as a ballast) or elements that also perform other functions (such as an energy storage device).

When the device 7 for managing the position of the centre of gravity of the airship 1 is a passive device, or in other words when the management of the position of the centre of gravity of the airship 1 is entirely passive, it may comprise a predetermined positioning of elements carried on board the airship 1, in such a way that the centre of gravity CdG of the airship 1 is situated between its longitudinal axis AL and the solar generator 6 situated above, facing into the sun, in nominal operation. The on-board elements may comprise at least one electric battery, and/or at least one fuel cell and/or at least one fuel tank or any other equipment the overall mass of which is sufficient to perform this function.

What is meant by nominal operation is the operation of the airship 1 when its speed with respect to the surrounding air is above or equal to the first threshold S1, and/or when the temperature of the solar generator is below or equal to the second threshold S2.

When the device 5 for stabilizing the attitude of the airship 1 is an active device, it may comprise aerodynamic control surfaces and/or gimbal-mounted thrusters and/or side thrusters and/or flywheels.

When the device 5 for stabilizing the attitude of the airship 1 is a passive device, it may consist of a pendulum return induced by siting the centre of gravity CdG of the airship 1 in such a way that it is situated between its longitudinal axis AL and the solar generator 6 situated above, facing into the sun, in nominal operation.

Two detailed nonlimiting embodiments now follow.

Figure 2A:
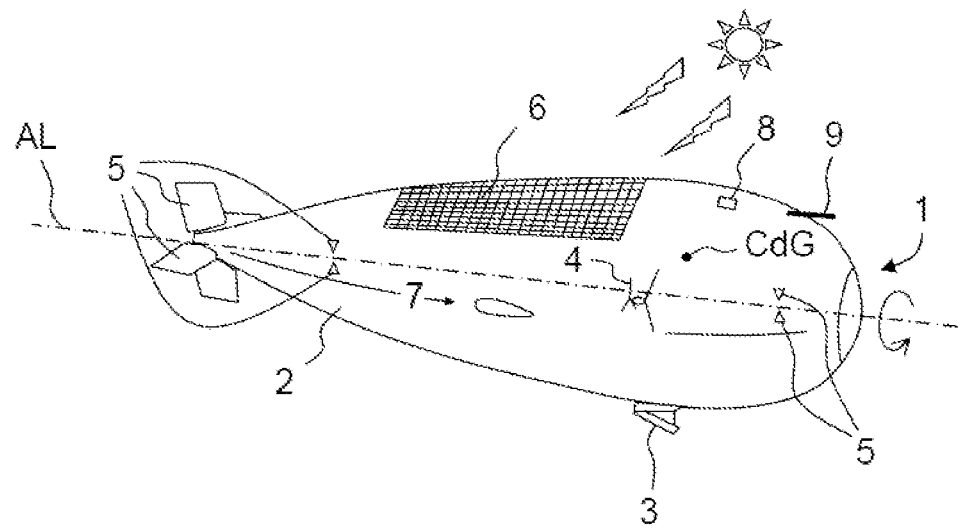
FIG. 2a schematically illustrates a stratospheric airship, according to one aspect of the invention.
Figure 2B:
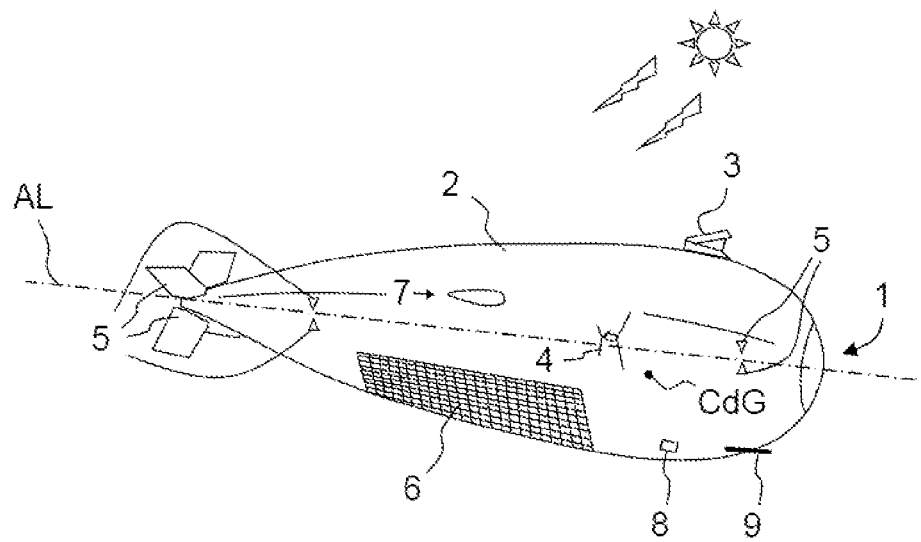

FIGS. 2a and 2b illustrate a stratospheric airship 1 comprising a passive device 7 for managing the position of the centre of gravity CdG of the airship 1 coupled to an active device 5 for stabilizing the attitude of the airship 1.

The position of the centre of gravity CdG of the airship 1 is positioned at the desired location, i.e. on the same side as the solar generator 6 with respect to the longitudinal axis AL, or, in other words, between the longitudinal axis AL and the top of the balloon, where the solar generator 6 is situated. In nominal operation of the airship 1, the solar generator 6 faces towards the sun and the attitude is controlled by the active device 5 for stabilizing the attitude, as illustrated in FIG. 2a.

This operation is performed on the ground before takeoff, by altering the position of various pieces of on-board equipment (avionics equipment, energy storage devices, etc.).

Once in flight, the attitude of the airship is influenced using the available actuators 5 such as: the aerodynamic control surfaces, and/or gimbal-mounted thrusters and/or side thrusters and/or flywheels, that form an active device for stabilizing the attitude of the airship.

If the speed of the airship 1 with respect to the surrounding air drops below the first threshold S1 and/or the temperature of the solar generator 6 reaches the second threshold S2, then the airship 1 pivots through approximately 180° about its longitudinal axis AL and the airship finds itself in the position illustrated in FIG. 2b, in which the solar generator 6 is protected from the sun.

Figure 3A:
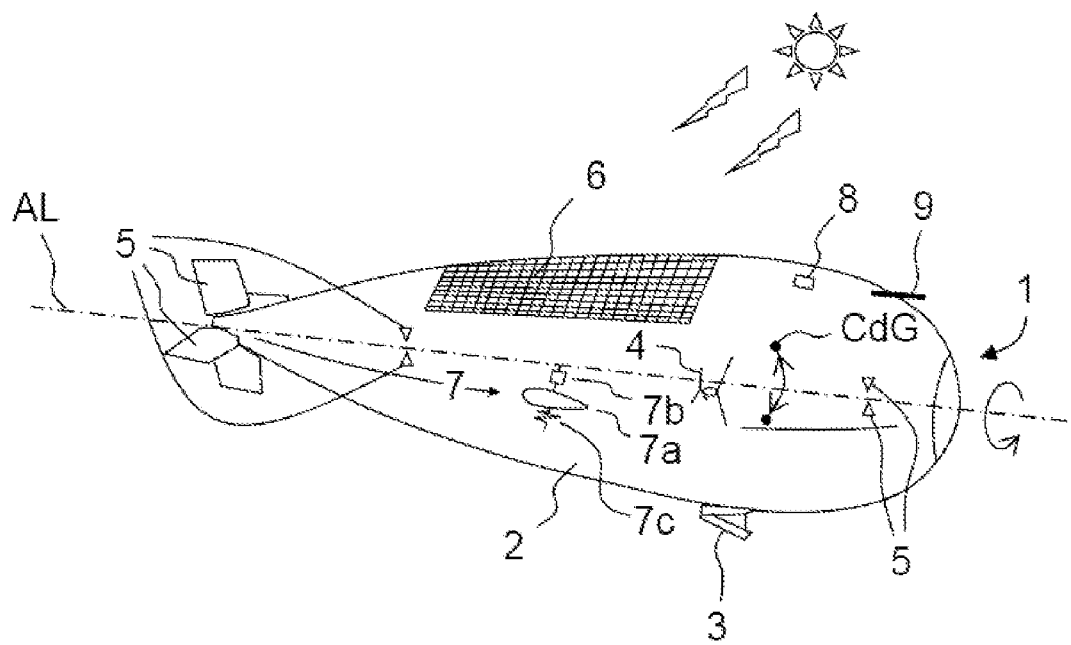
FIG. 3a schematically illustrates a stratospheric airship, according to one aspect of the invention.
Figure 3B:
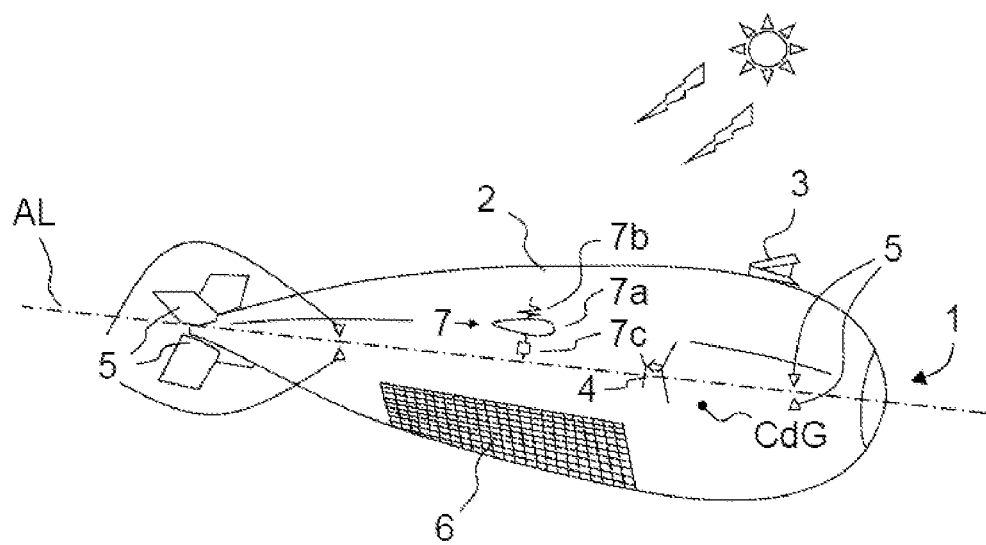

FIGS. 3a and 3b illustrate a stratospheric airship 1 comprising an active device 7 for managing the position of the centre of gravity CdG of the airship 1 coupled with a passive device 5 for stabilizing the attitude of the airship 1.

The position of the centre of gravity CdG is modified in flight by shifting weights in the required direction. To do that, certain modules 7a installed on the balloon 2 are rendered mobile. The battery modules are particularly favoured for this operation because of their appreciable mass. These modules 7a may be rendered mobile via a very reliable device based on return devices 7c and actuators 7b acting in opposite directions or via a system of actuators on rails or on cables.

The centre of gravity CdG of the airship 1 is positioned at the desired location in the nominal case, i.e. on the opposite side from the solar generator 6 with respect to the longitudinal axis AL, or, in other words, between the longitudinal axis AL and the payload gondola 3. In nominal operation of the airship 1, the solar generator 6 faces into the sun and the attitude is stabilized passively by the pendulum-return effect induced by the position of the centre of gravity CdG and controlled by the active device 5 for stabilizing the attitude, as illustrated in FIG. 3a.

If the speed of the airship 1 with respect to the surrounding air drops below the first threshold S1 and/or the temperature of the solar generator 6 reaches the second threshold S2, the active device 7 for managing the position of the centre of gravity CdG brings the centre of gravity CdG back between the longitudinal axis AL and the top of the balloon 2, where the solar generator 6 is situated. This action has the effect of generating a pendulum moment causing rotation by 180° about its longitudinal axis AL and the airship finds itself in the position illustrated in FIG. 3b, in which the solar generator 6 is protected from the sun.

The invention claimed is:

1. A stratospheric airship comprising a nonrigid balloon equipped with a solar generator arranged on an upper part of the nonrigid balloon intended to be illuminated in flight by the sun, the airship comprising: at least one device for managing a position of a center of gravity of the airship; at least one device for stabilizing an attitude of the airship; and a module which controls the attitude of the airship to specifically rotate said airship by substantially 180 degrees about its longitudinal axis, in response to at least one of a speed of travel of the airship with respect to surrounding air being below a first threshold (S1) or a temperature of the solar generator being above a second threshold (S2), so as to protect the solar generator from illumination by the sun, wherein the at least one device for managing the position of the center of gravity of the airship comprises a predetermined positioning of elements carried on board the airship, so that the center of gravity of the airship is situated between its longitudinal axis (AL) and the solar generator, and wherein the at least one device for stabilizing the attitude of the airship comprises aerodynamic control surfaces.

2. The stratospheric airship according to claim 1, wherein the first threshold (S1) is below 10 ms$^{-1}$.

3. The stratospheric airship according to claim 2, wherein the first threshold (S1) is equal to 5 ms$^{-1}$.

4. The stratospheric airship according to claim 1, wherein the second threshold (S2) is below 120° C.

5. The stratospheric airship according to claim 4, wherein the second threshold (S2) is equal to 100° C.

6. The stratospheric airship according to claim 1, wherein the at least one device for managing the position of the center of gravity of the airship further comprises an active device.

7. The stratospheric airship according to claim 6, wherein the active device for managing the position of the center of gravity of the airship comprises controlled elements configured to shift weights.

8. The stratospheric airship according to claim 7, wherein the controlled elements comprise actuators and return devices.

9. The stratospheric airship according to claim 7, wherein the weights comprise elements carried on board the airship.

10. The stratospheric airship according to claim 6, wherein the active device for managing the position of the center of gravity of the airship comprises at least one element able to move around the balloon.

11. The stratospheric airship according to claim 1, wherein the on-board elements comprise at least one electric battery, and/or at least one fuel cell and/or at least one fuel tank.

12. The stratospheric airship according to claim 1, wherein the at least one device for stabilizing the attitude of the airship further comprises a passive device.

13. The stratospheric airship according to claim 12, wherein the passive device for stabilizing the attitude of the airship is a pendulum return induced by a predetermined siting of the center of gravity of the airship, away from the longitudinal axis (AL).

14. A method for controlling a stratospheric airship comprising a nonrigid balloon equipped with a solar generator arranged on an upper part of the nonrigid balloon intended to be illuminated in flight by the sun, wherein a position of a center of gravity of the airship and stabilization of an attitude of the airship are controlled in a coupled manner by a module in said airship which controls the attitude of the airship to specifically rotate said airship by substantially 180 degrees about its longitudinal axis (AL), in response to at least one of a speed of travel of the airship with respect to surrounding air being below a first threshold (S1) or a temperature of the solar generator being above a second threshold (S2), so as to protect the solar generator from illumination by the sun, wherein the airship comprises a device for managing the position of the center of gravity of the airship, which comprises a predetermined positioning of elements carried onboard the airship, so that the center of gravity of the airship is situated between its longitudinal axis (AL) and the solar generator, and wherein the airship comprises a device for stabilizing the attitude of the airship, which comprises aerodynamic control surfaces.

* * * * *